US009573070B2

(12) United States Patent
Morley et al.

(10) Patent No.: US 9,573,070 B2
(45) Date of Patent: *Feb. 21, 2017

(54) PLUSH TOY WITH NON-RIGID SENSOR FOR DETECTING DEFORMATION

(71) Applicant: HALLMARK CARDS, INCORPORATED, Kansas City, MO (US)

(72) Inventors: Robert E. Morley, Lee's Summit, MO (US); Jennifer R. Garbos, Kansas City, MO (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,162

(22) Filed: Nov. 26, 2014

(65) Prior Publication Data
US 2015/0087198 A1     Mar. 26, 2015

Related U.S. Application Data

(60) Continuation of application No. 14/079,461, filed on Nov. 13, 2013, now Pat. No. 8,926,393, which is a
(Continued)

(51) Int. Cl.
*A63H 3/28*     (2006.01)
*A63H 3/02*     (2006.01)
(Continued)

(52) U.S. Cl.
CPC ........ *A63H 3/28* (2013.01); *A63H 3/02* (2013.01); *A63H 3/20* (2013.01); *G01L 1/205* (2013.01);
(Continued)

(58) Field of Classification Search
USPC ........................................................ 446/175
See application file for complete search history.

(56) References Cited

U.S. PATENT DOCUMENTS 4,503,705 A * 3/1985 Polchaninoff ............. G01L 1/20
                                                              338/114
4,996,511 A * 2/1991 Ohkawa ................. H01C 10/10
                                                              338/114
(Continued)

OTHER PUBLICATIONS

Canadian Examiner's Report dated Mar. 21, 2016 in Canadian Patent Application No. 2,848,890, 4 pages.

*Primary Examiner* — Tramar Harper
(74) *Attorney, Agent, or Firm* — Shook, Hardy & Bacon L.L.P.

(57) ABSTRACT

A plush toy having electronics therein for interacting with a user includes a non-rigid electrical component for detecting deformation thereof. The component, also referred to as a hug sensor, has an electrically conductive and compressible material and is movable from a rest, non-compressed position towards a compressed position by way of the application of an external force thereon (e.g., a hug or squeeze). The hug sensor has a resistance there across that is monitored by a microprocessor. Compression of the hug sensor causes changes in the resistance across the hug sensor. Changes in the detected resistance across the hug sensor result in activation of responses (e.g., playing of audio and/or movement). Varying responses may be activated as a result of varying changes in resistance.

10 Claims, 9 Drawing Sheets

Related U.S. Application Data division of application No. 12/956,352, filed on Nov. 30, 2010, now Pat. No. 8,596,147.

(51) Int. Cl.
  *G01L 1/20* (2006.01)
  *H01H 3/14* (2006.01)
  *A63H 3/20* (2006.01)
  *A63H 9/00* (2006.01)
  *A63H 33/26* (2006.01)

(52) U.S. Cl.
  CPC ........ *H01H 3/14* (2013.01); *A63H 9/00* (2013.01); *A63H 33/26* (2013.01)

(56) References Cited

U.S. PATENT DOCUMENTS

| | | | |
|---|---|---|---|
| 5,470,270 A * | 11/1995 | Beamon et al. | 446/354 |
| 5,652,606 A | 7/1997 | Sasaki et al. | |
| 5,878,620 A * | 3/1999 | Gilbert et al. | 73/172 |
| 6,053,797 A * | 4/2000 | Tsang et al. | 446/297 |
| 6,106,358 A | 8/2000 | McKenzie | |
| 6,160,540 A | 12/2000 | Fishkin et al. | |
| 6,168,494 B1 | 1/2001 | Engel et al. | |
| 6,291,568 B1 | 9/2001 | Lussey | |
| 6,315,163 B1 | 11/2001 | Shu | |
| 6,495,069 B1 | 12/2002 | Lussey et al. | |
| 6,514,118 B1 | 2/2003 | Bart et al. | |
| 6,646,540 B1 | 11/2003 | Lussey | |
| 6,661,239 B1 * | 12/2003 | Ozick | 324/658 |
| RE39,791 E | 8/2007 | Jurmain et al. | |
| 7,405,372 B2 | 7/2008 | Chu | |
| 7,554,045 B2 | 6/2009 | Sandbach et al. | |
| 7,554,051 B2 | 6/2009 | Crispin | |
| 8,300,868 B2 | 10/2012 | Kilburn et al. | |
| 2005/0103124 A1 * | 5/2005 | Asai | G01L 1/20 73/862.046 |
| 2006/0162471 A1 * | 7/2006 | Bieck | G01L 1/20 73/862.632 |
| 2007/0128979 A1 * | 6/2007 | Shackelford et al. | 446/484 |
| 2009/0118598 A1 | 5/2009 | Hoarau et al. | |
| 2010/0062148 A1 | 3/2010 | Lussey et al. | |
| 2010/0063779 A1 | 3/2010 | Schrock et al. | |
| 2010/0201650 A1 | 8/2010 | Son | |
| 2010/0225340 A1 | 9/2010 | Smith et al. | |
| 2011/0253948 A1 | 10/2011 | Lussey et al. | |
| 2012/0074966 A1 | 3/2012 | Graham et al. | |
| 2012/0074970 A1 | 3/2012 | Graham et al. | |
| 2012/0120009 A1 | 5/2012 | Lussey et al. | |

* cited by examiner

PLUSH TOY WITH NON-RIGID SENSOR FOR DETECTING DEFORMATION

CROSS-REFERENCE TO RELATED APPLICATIONS

The present application is a continuation application of pending U.S. application Ser. No. 14/079,461, entitled "PLUSH TOY WITH NON-RIGID SENSOR FOR DETECTING DEFORMATION", filed Nov. 13, 2013, which is a divisional application of U.S. Pat. No. 8,596,147 (U.S. application Ser. No. 12/956,352), entitled "NON-RIGID SENSOR FOR DETECTING DEFORMATION", filed Nov. 30, 2010, issued on Dec. 3, 2013.

STATEMENT REGARDING FEDERALLY SPONSORED RESEARCH OR DEVELOPMENT

Not applicable.

BRIEF SUMMARY OF THE INVENTION

The present invention relates to a "soft" electrical sensor. More particularly, this invention relates to a flexible and compressible sensor that can be incorporated into compressible items where a rigid sensor would be undesirable. The sensor can not only detect compression of the sensor, but can also detect varying degrees of compression, thereby permit responsive actions related to the degree of compression.

Numerous types of plush toys (e.g., teddy bears) and items with electronics therein are known in the art. Generally, however, the mechanical and electrical components inside the plush are perceptible by the user of the plush upon squeezing the plush, as they are generally a hard, rigid material, such as plastic and/or metal. This is in contrast to the overall purpose of the plush in the first place, i.e., to be soft.

The method and apparatus of the present invention overcomes these and other drawbacks by providing an electrical component which is soft, squeezable, and resilient. In one embodiment a soft sensor is designed for use in a plush toy to identify interaction and even degrees of interaction with the plush toy by a user. As a holder of the plush toy gently squeezes the plush, the sensor initially identifies a first level of compression and thereby identifies it with a gentle hug, at which point the plush may respond with an appropriate audible response. As the holder of the plush squeezes the plush harder, the sensor identifies a greater level of compression associated with a stronger hug and provides for playback of an alternate appropriate audible response.

In one embodiment, the sensor may include a pair of conductive foam sheets separated by a non-conductive foam sheet. The non-conductive foam sheet has one or more holes therethrough. As such, the conductive foam sheets are space apart by the non-conductive foam sheet, but the two outer conductive foam sheets may be made to connect in the holes by compressing the two outer sheets together.

Further objects, features and advantages of the present invention over the prior art will become apparent from the detailed description of the drawings which follows, when considered with the attached figures.

BRIEF DESCRIPTION OF THE SEVERAL VIEWS OF THE DRAWINGS

The features of the invention noted above are explained in more detail with reference to the embodiments illustrated in the attached drawing figures, in which like reference numerals denote like elements, in which FIGS. 1-16 illustrate several possible embodiments of the present invention, and in which:

FIG. 1 is a front side elevation view of a plush toy having a sensor constructed in accordance with an embodiment of the present invention positioned therein in a use environment;

FIG. 2 is a front side elevation view of the plush toy of FIG. 1;

FIG. 3 is an illustration similar to FIG. 2, but with portions of the plush toy cut away to reveal an embodiment of the sensor of the present invention and electrical components therein;

FIG. 4 is an illustration similar to FIG. 3, but with an alternate arrangement of the electrical component connections;

FIG. 5 is a left side elevation view of the plush of FIG. 2 in a rest position and with a portion thereof cut away to illustrate the sensor in a rest position;

FIG. 6 is an illustration similar to FIG. 5, but with the plush and the sensor in a compressed position;

FIG. 7 is a perspective view of a first embodiment of the sensor of the present invention with a portion of an enclosure cut away for clarity;

FIG. 8 is a side elevation view of the sensor of FIG. 7;

FIG. 9 is a cross-sectional view taken along the line 9-9 of FIG. 7;

FIG. 10 is a view similar to FIG. 9, but with the sensor in a compressed position;

FIG. 11 is an enlarged, fragmentary view of the sensor of FIG. 10 in the area 11;

FIG. 12 is an exploded, perspective view of the sensor of FIG. 7;

FIG. 13 is a perspective view of a second embodiment of the sensor of the present invention with a portion of an enclosure cut away for clarity;

FIG. 14 is side elevation view of the sensor of FIG. 13;

FIG. 15 is a cross-sectional view taken along the line 15-15 of FIG. 13; and

FIG. 16 is an exploded perspective view of the sensor of FIG. 13.

DETAILED DESCRIPTION OF THE INVENTION

Figure 1:
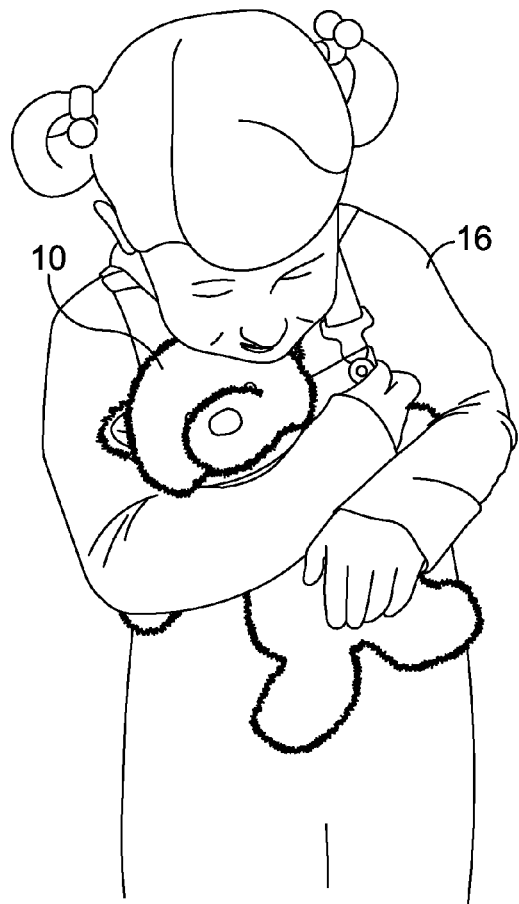
Figure 2:
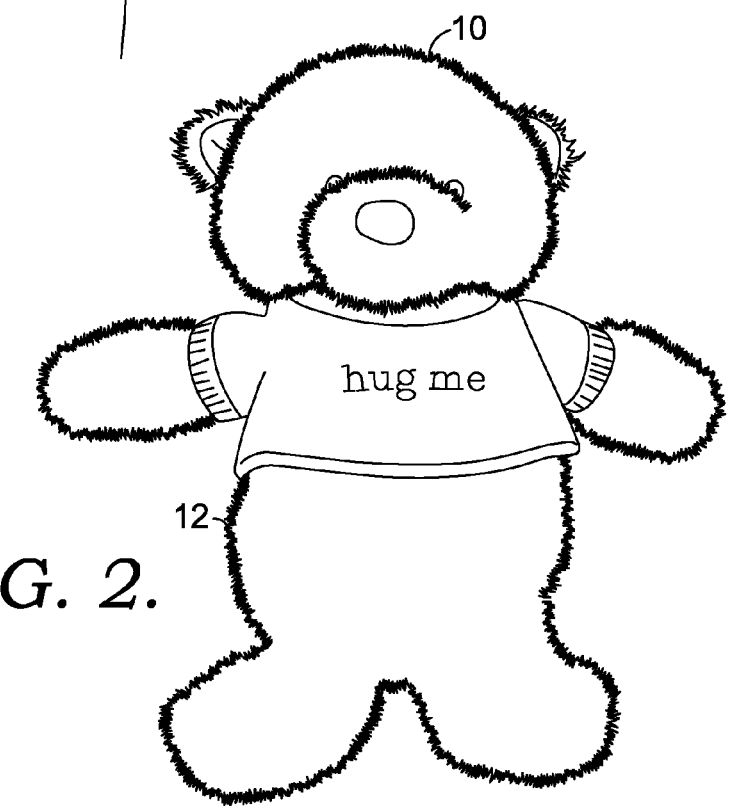

Referring now to the drawings in more detail and initially to FIG. 1, numeral 10 generally designates a plush item or toy, such as a teddy bear. The plush 10 may be of any configuration or shape, but generally includes a soft fabric outer layer 12 and is generally filled with some type of soft compressible fill material 14. This well-known combination creates a plush item 10 that children 16 like to hold and/or squeeze, as pictured in FIG. 1.

This particular plush 10 includes electrical components 18 that allow the plush 10 to interact with the child 16. The electrical components 18 generally include a battery 20, a micro-processor 22, a speaker 24, a plush hug sensor 26 of the present invention, and a plurality of the wires 28 connecting all of the other electrical components 18 to make an electrical circuit 30.

The battery 20 can be any power source known in the art. When the plush hug sensor 20 is positioned inside a plush item 10, the power source is preferably a self-contained device, such as the battery 20. The battery 20, as is known in the art, is preferably contained inside a battery compartment or housing 32. As the battery housing 32 is generally necessarily a rigid structure, and an item which users occasionally need access to in order to replace the battery 20, the battery housing is preferably positioned adjacent the outer layer 12. Additionally, as children 16 generally hug the torso or trunk 34 of the plush item, rigid or non-soft items are preferably positioned above or below the middle 34 of the plush toy 10. In the embodiments illustrated in FIGS. 3-6, the battery compartment 32 is positioned inside a pocket 36 which is accessed through a rear 38 of the plush 10 near a lower most portion 40 of the trunk 34. It should be noted that the battery compartment 32 can be positioned anywhere within the plush toy 10.

Similarly, the speaker 24 may be positioned within a rigid housing 42 to protect it from damage. In the illustrated embodiments, the speaker housing 42 is positioned in a head 44 of the plush 10 adjacent or directly behind where the animal figure's mouth would be such that audio emanating from the speaker 24 appears to be spoken by the plush 10 or emanating from its mouth.

Figure 3:
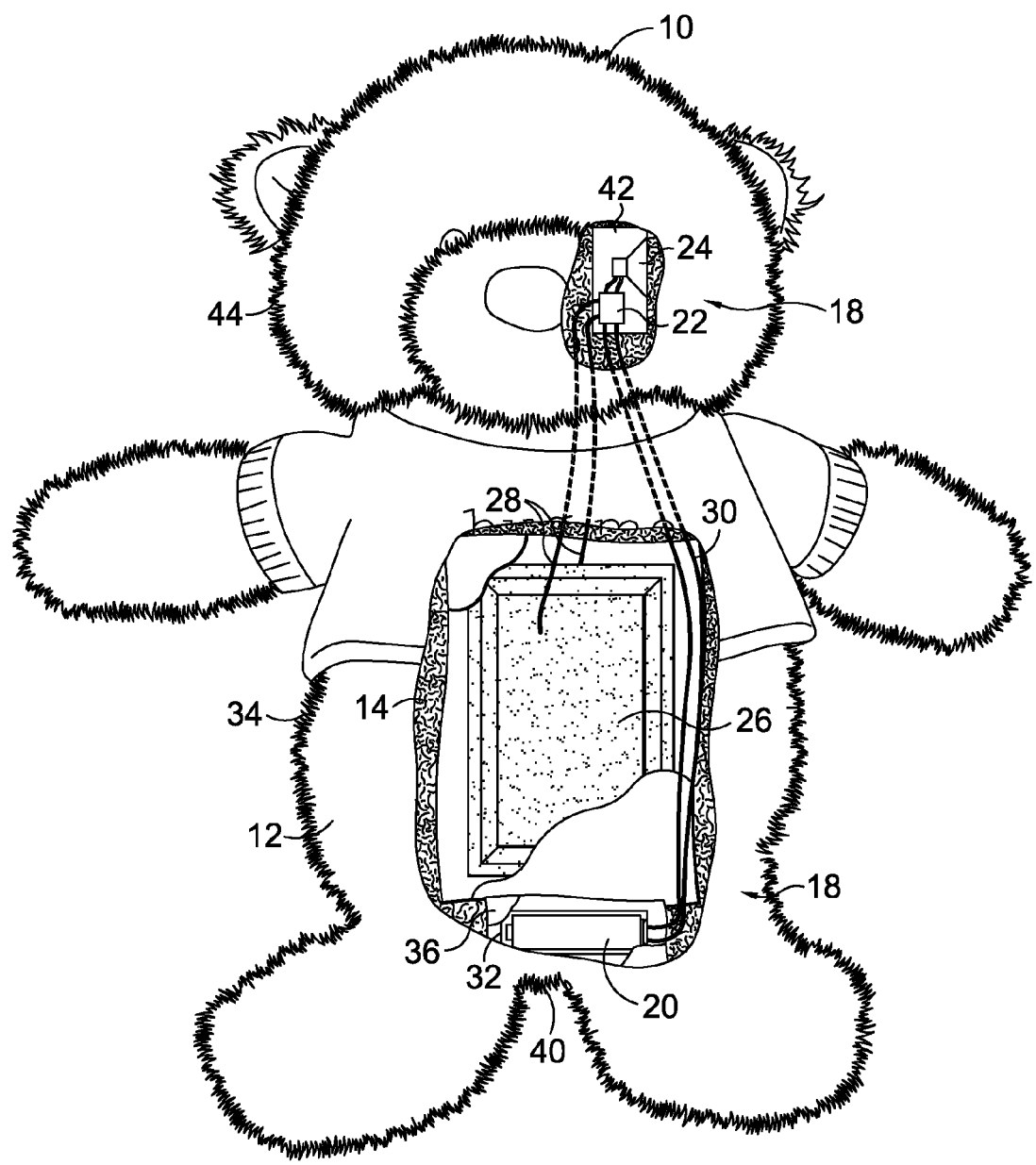
Figure 4:
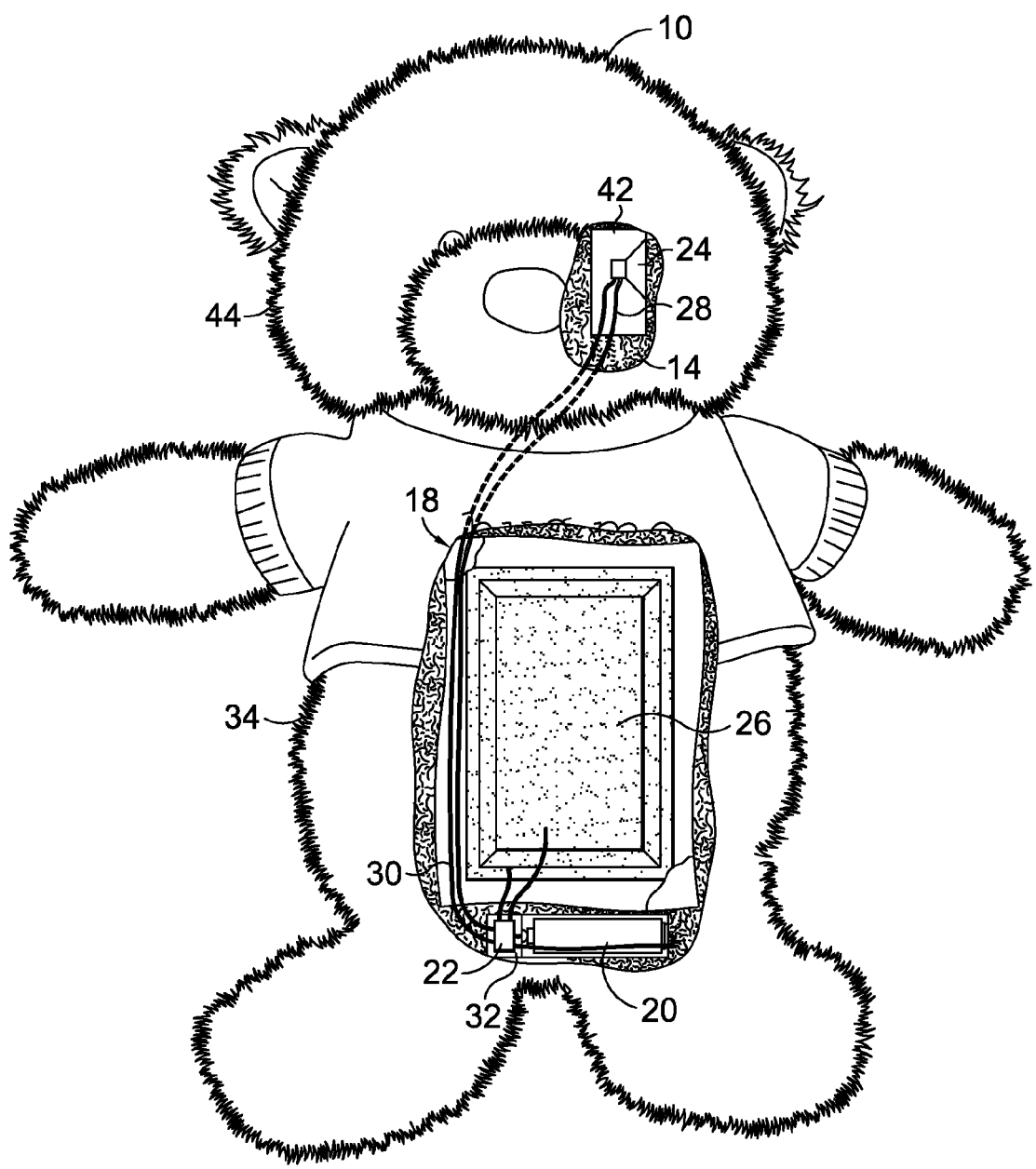

The microprocessor 22, to be protected from damage, may be positioned in either the battery compartment 32 or the speaker housing 42. FIG. 3 illustrates an embodiment where the microprocessor 22 is positioned in the speaker housing 42 and FIG. 4 illustrates an embodiment where the microprocessor 22 is positioned in the battery compartment 32.

The sensor 26, which has been identified as a plush hug sensor for reasons that will become apparent after the benefit of this full disclosure but which is not constrained for use in a plush or for detecting hugs, is preferably constructed as a multi-layer device. In a first embodiment illustrated in FIGS. 7-12, the sensor 26 preferably includes a pair of conductive foam sheets 46, 48 separated by a non-conductive foam sheet 50. While the sensor may be made with only the three layers of foam, preferably, adhesive layers 52 and 54 are positioned intermediate the foam layers to secure the foam layers to one another and to maintain the structural integrity of the sensor 26, as will be discussed in more detail below.

Figure 9:
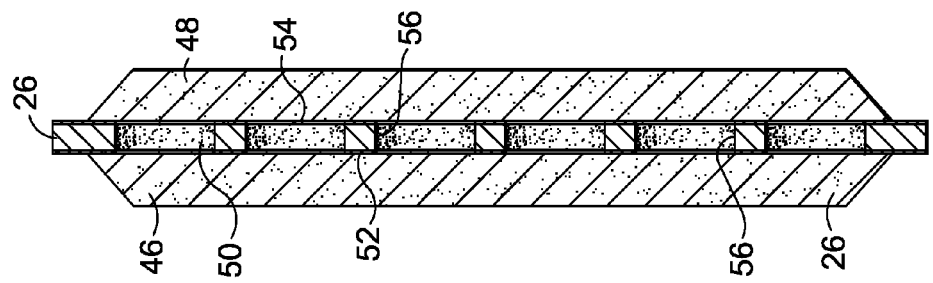
Figure 12:
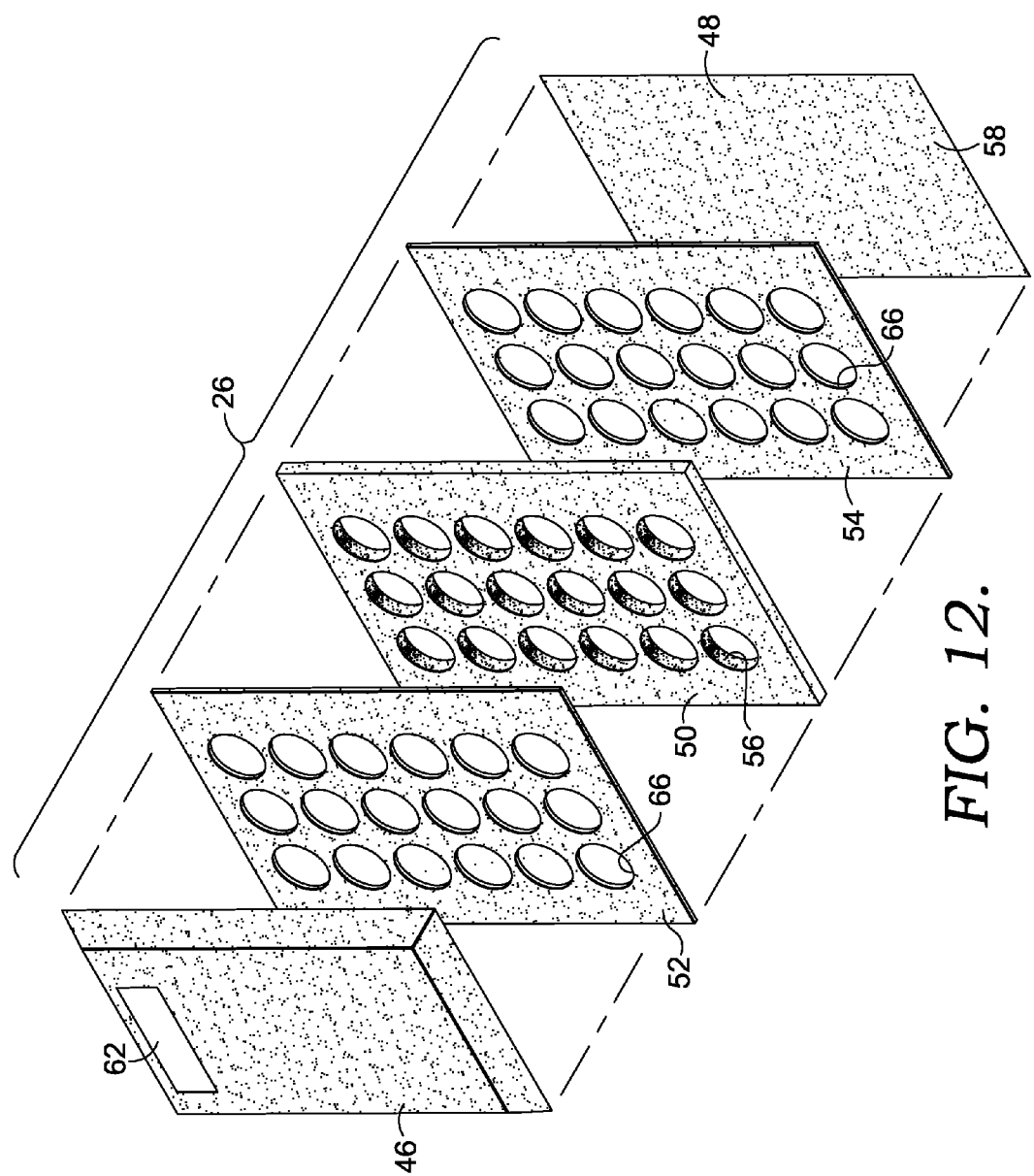
Figure 13:
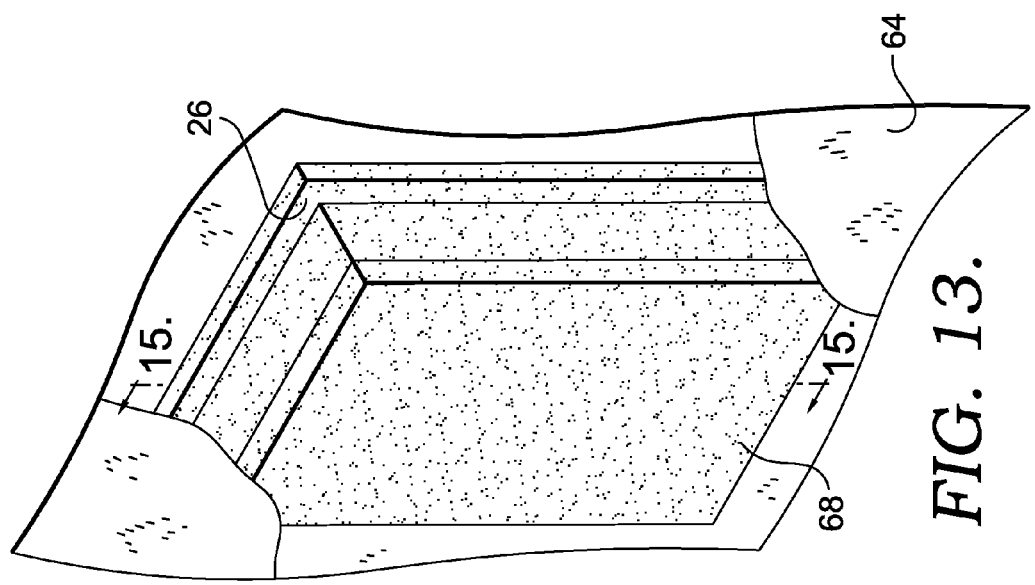
Figure 14:
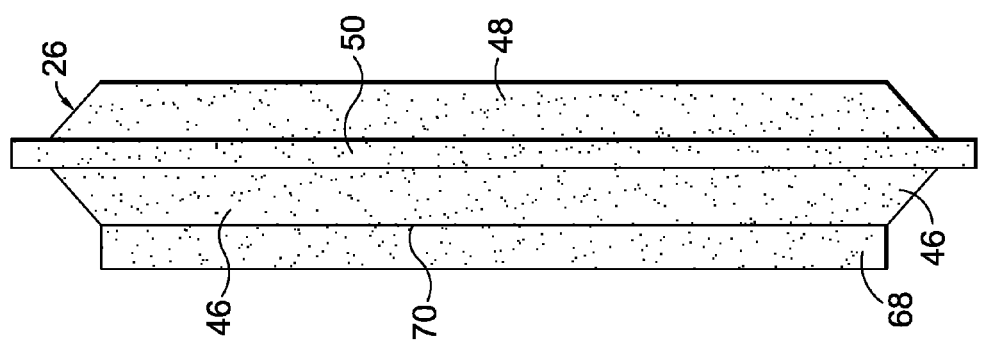
Figure 15:
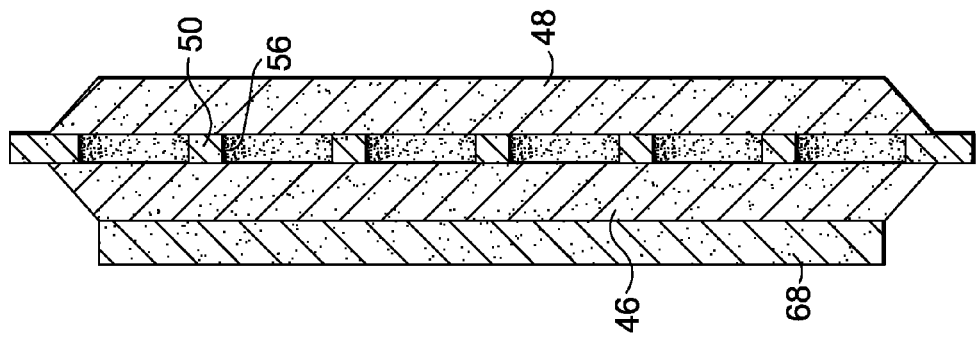
Figure 16:
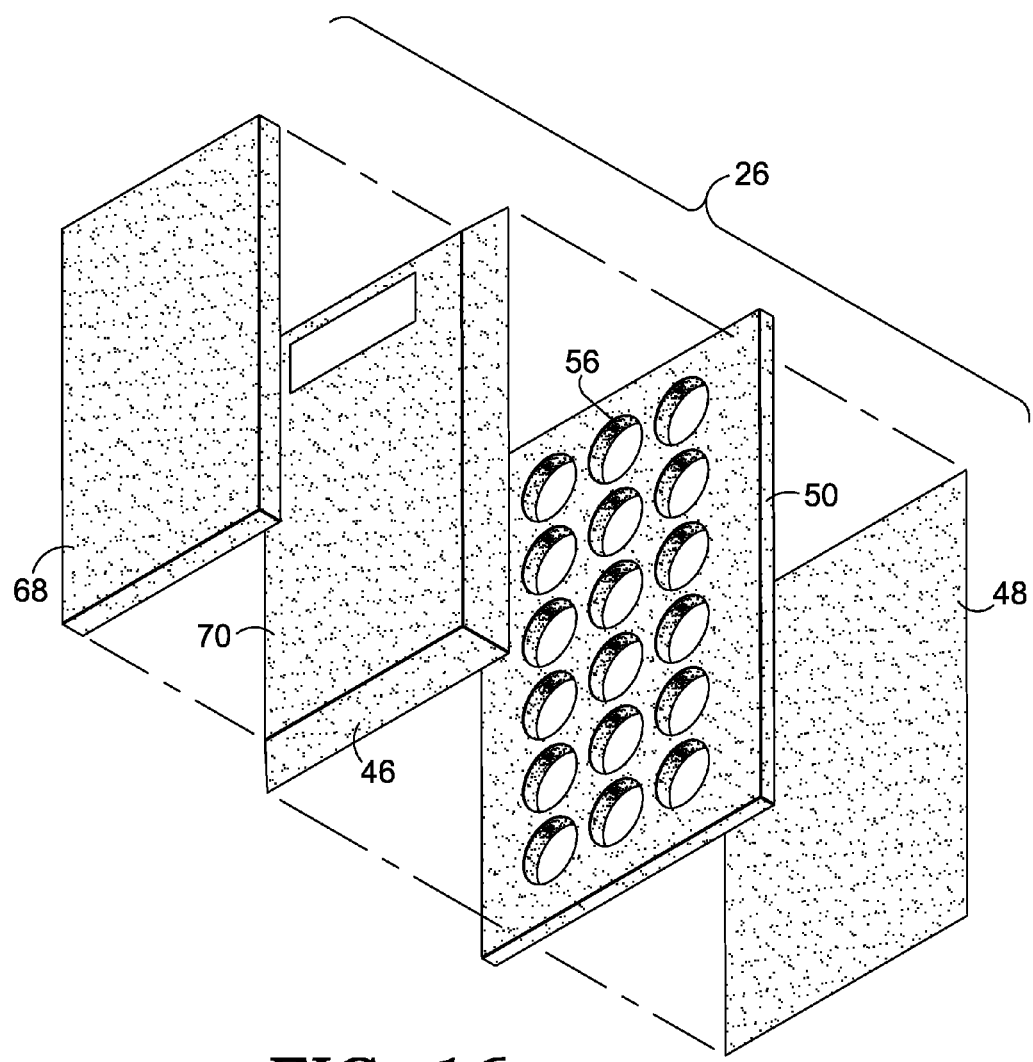

The non-conductive foam 50, which is intermediate the two outer foam layers 46, 48, includes one or more holes or apertures 56 therethrough, as best illustrated in FIGS. 9 and 12. While the intermediate, non-conductive foam layer 50 spaces apart the two conductive foam layers 46, 48, the holes 56 through the non-conductive foam 50 provide an opening through the non-conductive layer 50 where inwardly facing surfaces 58 of the conductive layers 46, 48 can connect in abutting contact when moved towards one another. In that regard, the sensor 26 has a normal rest or non-compressed position that is illustrated in FIGS. 5 and 7-9. In this position, as best illustrated in FIG. 9, the inwardly facing surfaces 58 of the outer conductive layers 46, 48 are spaced apart from one another and do not provide an electrical connection from one layer to another or across the sensor 26. In this regard, the sensor 26, in this state, essentially acts as an open switch to prevent the flow of current across the sensor 26 and through the circuit 30.

Figure 10:
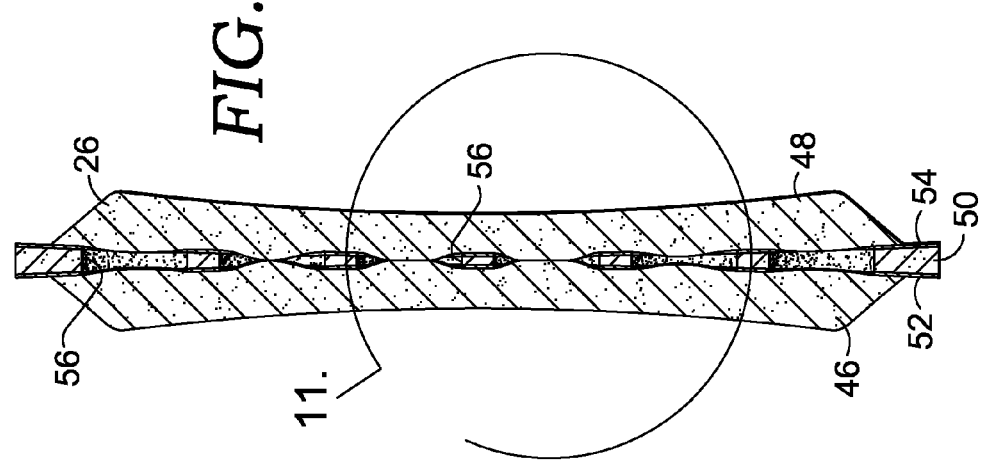
Figure 11:
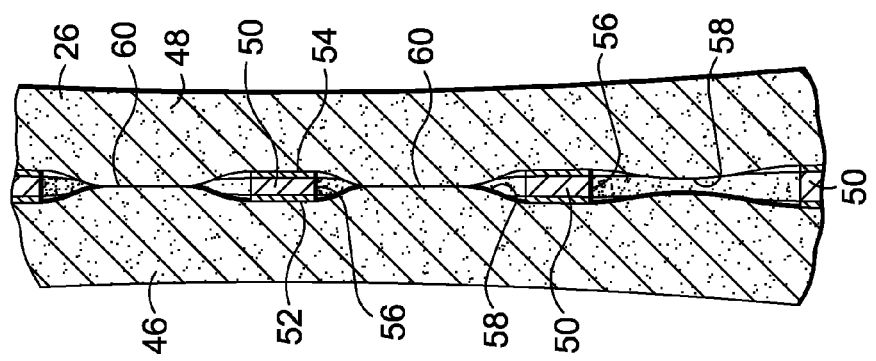

Because the sensor 26 is compressible (or at least because the two conductive layers 46, 48 are moveable towards one another), external forces on the sensor 26, preferably from opposite sides of the sensor 26 in the form of compression forces, will act to compress the non-conductive foam layer 50 and move the inwardly facing surfaces 58 of the two conductive layers 46, 48 towards one another until they are in abutting contact in the areas where the non-conductive foam layer 50 has apertures 56, as best illustrated in FIGS. 10 and 11. Accordingly, the sensor 26 has a second or compressed state where at least a portion of one of the conductive foam layers 46, 48 is in abutting contact with a portion of the other conductive foam layer 46, 48. This abutting contact, identified in FIG. 11 by numeral 60, makes an electrical connection which permits current to flow through the sensor 26 and from one of the foam layers 46, 48 to the other. As such, in the compressed state, the sensor 26 acts as a closed switch to complete the electrical circuit 30.

Figure 8:
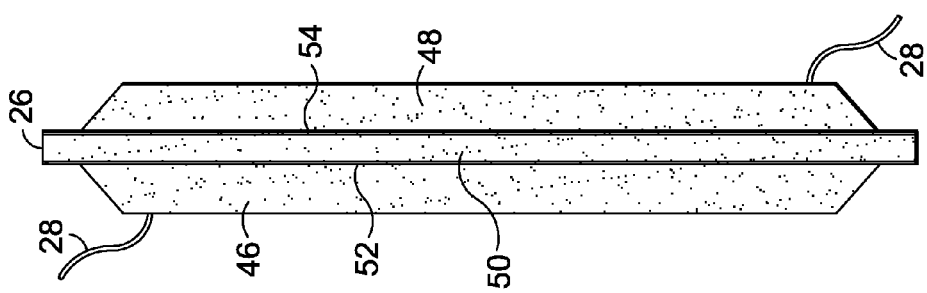
Figure 7:
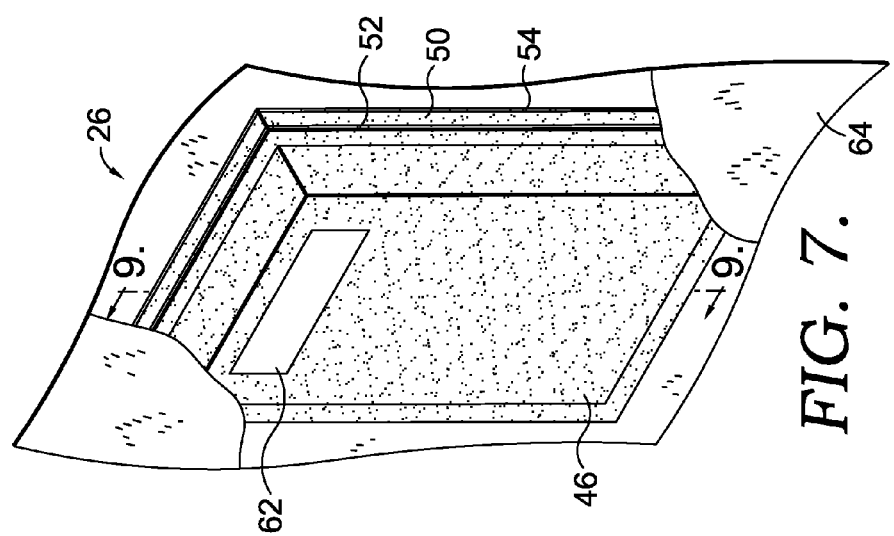

The conductive foam used in the outer layers 46, 48, has a known resistance per length or distance between connection points. Accordingly, if a piece of the conductive foam were to be placed in a circuit with a contact going in one end of the foam and another out the other end, if the distance between the contacts through the foam was known, a known resistance level could be calculated. The resistance level could be changed slightly by compression of the foam thereby decreasing the resistivity of the foam piece. While the connections to the conductive layers 46, 48 of the sensor 26 can be made by inserting wires 28 therein, as illustrated in FIGS. 3, 4 and 8, the wires 28 can also be connected to the conductive layer by way of a piece of conductive copper tape 62 with a conductive adhesive, as best illustrated in FIGS. 7 and 12.

With a known resistivity for the conductive foam, the location at which the wires 28 are connected to the outer layers 46, 48 will have an effect on the voltage across the sensor 26. For example, in FIG. 8, the leads are wires 28 are connected to the sensor on opposite sides and at opposite ends. Consequently, a single connection point between the outer layers 46, 48 towards the upper portion of the sensor in FIG. 8 will result in a resistance that is similar to a single connection by compression at the lower end of the sensor 26. Alternatively, if both leads were placed in the sensor on opposite sides at about the same location, the resistance would appear differently if the connection occurred farther away from the leads than if the connection occurred closer to the leads. These differences can be used and incorporated into the responses that are given, depending on the desired purpose of the sensor.

In addition to the compressing of the conductive foam changing the resistance through the foam, the amount of surface area connection between the inwardly facing surfaces 58 of the two outer conductive foam layers 46, 48 also changes the resistance across the sensor 26 and can be measured as a change in voltage by the micro-processor 22. In that regard, if contact is only made between the two layers 46, 48 through one hole 56 in the non-conductive or insulated foam layer 50, a first resistivity value occurs that is associated with a first voltage level through the circuit 30. If, however, more of the sensor 26 is compressed such that contact is made between the two layers 46, 48 through multiple holes 56, as illustrated in FIGS. 10 and 11, an alternate and decreased resistance level is provided across the sensor 26 resulting in a second resistance and, in turn, a second voltage through the circuit that can be measured again by the micro-processor 22. These detected changes correlate with a level of interaction with the sensor 26 and, in turn, changes in a level of interaction with the item, such as the plush toy 10 into which the sensor 26 is inserted. These detected changes can be used to create responses to the changes in interaction such as, for example, varying audio messages that are played back to the user or child 16 by the micro-processor 22 through the speaker 24. For instance, in one example, a child may gently squeeze the plush toy 10 just enough to compress the sensor 26 sufficiently such that the outer layers 46 and 48 connect with each other through one hole 56. The micro-processor can notice the change in the circuit 30 from an open circuit to a closed circuit and can associate the resulting voltage through the circuit 30 with an appropriate response message. An exemplary response message would be "Thanks for the gentle hug. Can you give a bear hug too?" Should the child 16 squeeze harder, such that a greater amount of surface area of the two foam layers 46, 48 abut one another through multiple holes 56 in the insulation layer 50, the microprocessor 22 can recognize the resulting voltage change, associated with an increased compression or squeeze of the sensor 26 and output an appropriate response, such as "You did it! Are you a bear too?" It should be noted that other responses, apart from audio responses, may be made based on detected changes by the sensor. Other responses may include for example, but are not limited to, activation or modification of light output, motion or data output based on the sensor readings, as well as changes in volume of audio outputs.

Figure 5:
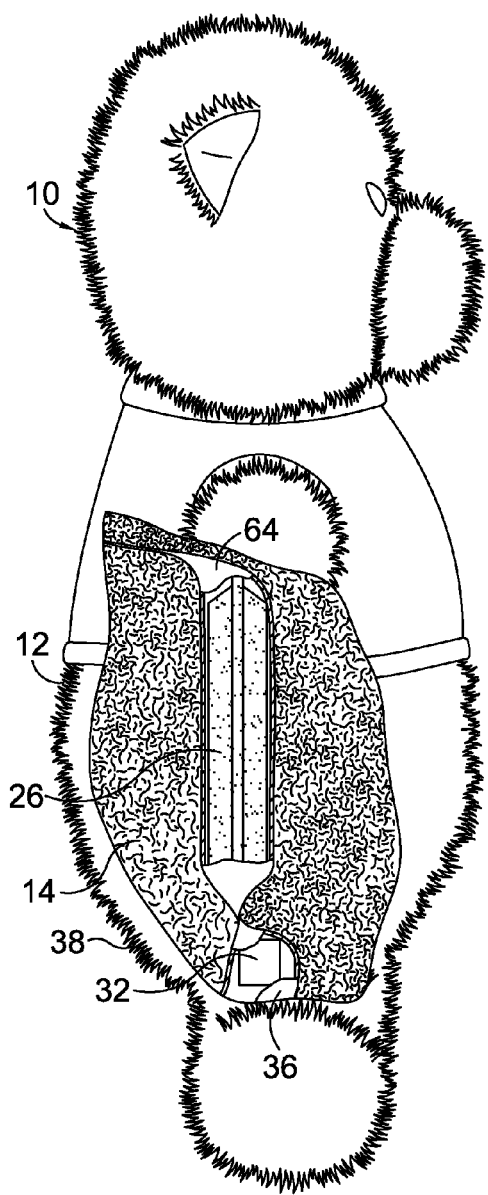
Figure 6:
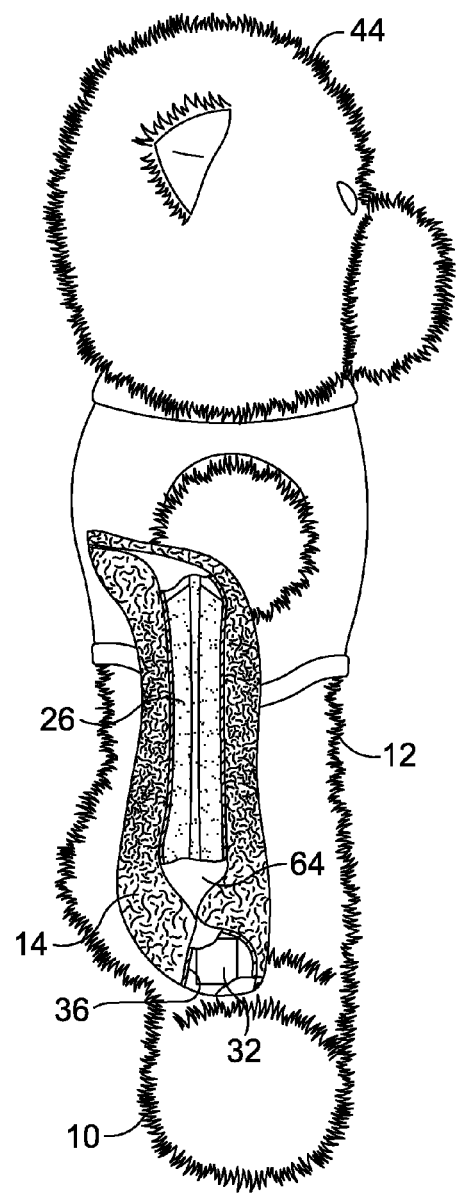

The sensor 26 may be placed inside a fabric pouch 64, similar to a pillow case, with the wire leads exiting the pouch. This assists with assembly of the plush toy 10 and allows for positioning of the sensor 26 in a desired location in the plush by securing, such as by sewing, a portion of the pouch 64 to the outer layer 12, as illustrated in FIGS. 5 and 6. While the sensor 26 has been described as having a use for incorporation into a plush toy for detecting squeezes or hugs thereof, the sensor 26 can be used in a number of environments and should not be limited to one particular use.

The adhesive layers 52, 54, as discussed above, work to not only hold the sensor 26 together but to prevent distortion or shrinking/closing of the apertures 56 in the non-conductive layer 50, thereby keeping them open to permit the opposing layers 46, 48 to abut therein. The adhesive layers 52, 54 can take the form of a two-sided non-conductive adhesive tape, as illustrated in FIG. 12, or may be a liquid, such as a glue, applied via conventional solution coaters. One possible manufacturing method for the embodiment of the sensor 26 illustrated in FIG. 12 includes using sheets of double-sided tape having a non-adhesive backer applied to both sides of the tape. A sheet of the tape may then have the backer layer removed from one of the sides of the tape to reveal the adhesive surface and placing the tape on one side of a sheet of non-conductive foam. A similar step may be taken by placing a second sheet of adhesive tape on the other side of the non-conductive foam sheet. The three layered resulting assembly may be then passed to a machine where it is die cut to not only form the apertures 56 but to also size the middle layer 50 of the sensor 26. In this manufacturing method, holes 66 are cut through the double-sided tape that forms the adhesive layers 52 and 54 at the same time as the holes 56 are cut through the insulation layer 50. As such, the holes 56, 66 align. The three layer assembly may then be passed on to have the outer conductive foam layers 46, 48 applied thereto by removal of the backing sheets on the outer surfaces of the double sided tape, thereby revealing the adhesive layer on the outer surfaces of the three layered assembly and creating the sensor 26 illustrated in FIGS. 7 through 12.

FIGS. 13 through 16 illustrate an alternate embodiment of the sensor 26. In this embodiment, an additional outermost layer of nonconductive foam 68 is secured to an outer surface 70 of the conductive foam layer 46. The outer layer of nonconductive foam material 68 provides the sensor 26 with increased resiliency and firmness without compromising its soft nature.

Many variations can be made to the illustrated embodiments of the present invention without departing from the scope of the present invention. Such modifications are within the scope of the present invention. For example, the circumference, shape, and number of holes 56 may be modified depending on the characteristics desired in the sensor 26. In that regard, the holes may be round, square, triangular, etc. There may be a single hole or a plurality of holes. Also, the holes may be small or large and the thickness of the insulating layer may be modified. Additionally, while the sensor has been shown as a generally plainer item, the sensor could be constructed as a cylinder or other shapes depending on the desired properties and configuration. Further, while the wires 28 are shown connected to the sensor in one embodiment by way of a coppered tape 62, other methods, such as two sided conductive tape (carbon infused, conductive polymers, and the like), conductive adhesives including "super glues", epoxies and other conductive adhesives or other methods known in the art for holding electrical leads in low electrically resistive contact with the conductive foam are acceptable. Similarly, the electrically conductive lead or wire 28 could simply be inserted into an area of the conductive foam and secured therein by applying a conductive adhesive to the lead prior to inserting it into the foam or by applying adhesive to the lead where it exits the foam. Further still, while the conductive and non-conductive layers have been identified as a foam, any compressive or stretchable material with the same conductivity properties will suffice. Other modifications would be within the scope of the present invention.

From the foregoing it will be seen that this invention is one well adapted to attain all ends and objects hereinabove set forth together with the other advantages which are obvious and which are inherent to the method and apparatus. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A plush toy having electronics therein for interacting with a user, the plush toy comprising:
   a deformable body portion; and
   electrical components positioned in the body portion, the electrical components including a microprocessor and a hug sensor, the hug sensor having an electrically conductive and compressible material,
   wherein the hug sensor comprises an open circuit when in a rest, non-compressed position, and is movable towards a compressed position, via application of an external force,
   wherein the hug sensor comprises a closed circuit when in the compressed position such that the hug sensor has a resistance there across, wherein resistance across the hug sensor is variable based on a degree of compression of the hug sensor,
   wherein the degree of compression corresponds to an amount of surface area connection between a first inwardly facing surface and a second inwardly facing surface of the hug sensor,
   wherein the microprocessor detects changes in resistance across the hug sensor as a result of changes in degrees of compression, and wherein when the hug sensor comprises the closed circuit, the microprocessor initiates different responses based on the different detected degrees of compression of the hug sensor.

2. The plush toy of claim 1, wherein the electrical components further include a speaker, a memory component, and a plurality of audio files stored in the memory component, wherein the microprocessor initiates playback of an audio file upon detection of a change in resistance across the hug sensor, and wherein the different responses based on the different detected degrees of compression of the hug sensor includes playing different audio files from the plurality of audio files stored in the memory component.

3. The plush toy of claim 2, wherein the microprocessor detecting changes in resistance across the hug sensor as a result of changes in degrees of compression includes monitoring changes in voltage levels across the hug sensor, wherein the microprocessor initiates playback of a first audio file upon detection of a first voltage level, and wherein the microprocessor initiates playback of a second audio file upon detection of a second voltage level.

4. The plush toy of claim 1, wherein the microprocessor detecting changes in resistance across the hug sensor as a result of changes in degrees of compression includes monitoring changes in voltage levels across the hug sensor, wherein the microprocessor initiates playback of a first audio file upon detection of a first voltage level, and wherein the microprocessor initiates playback of a second audio file upon detection of a second voltage level.

5. The plush toy of claim 1, wherein the electrical components further include a motion module, wherein the microprocessor initiates activation of the motion module upon detection of a change in resistance across the hug sensor as a result of a change in degree of compression, thereby causing the plush toy to move.

6. A plush toy having electronics therein for interacting with a user, the plush toy comprising:
a body portion having a soft fabric exterior and plush stuffing therein; and
electrical components positioned in the body portion, the electrical components including a battery, a microprocessor, a hug sensor, and a plurality of wires electrically coupling the battery, microprocessor and hug sensor together to form an electric circuit, the hug sensor having an electrically conductive and compressible material, wherein the hug sensor comprises an open circuit when in a rest, non-compressed position, and is movable towards a compressed position, via application of an external force, wherein the hug sensor comprises a closed circuit when in the compressed position such that the hug sensor has a resistance there across, wherein resistance across the hug sensor is variable based a degree of compression of the hug sensor, the degree of compression corresponding to an amount of surface area connection between a first inwardly facing surface and a second inwardly facing surface of the hug sensor, wherein the microprocessor detects changes in resistance across the hug sensor as a result of changes in degrees of compression, and wherein when the hug sensor comprises the closed circuit, the microprocessor initiates different responses based on the different detected degrees of compression of the hug sensor.

7. The plush toy of claim 6, wherein the electrical components further include a speaker, a memory component, and a plurality of audio files stored in the memory component, wherein the microprocessor monitors the resistance across the hug sensor, wherein the microprocessor initiates playback of a first audio file upon detection of a change in resistance across the hug sensor of a first level, and wherein the microprocessor initiates playback of a second audio file upon detection of a change in resistance across the hug sensor of a second level.

8. The plush toy of claim 7, wherein the second level of detected change in resistance is greater than the first level of change in resistance, wherein the first audio file is played back at a first audio level, wherein the second audio file is played back at a second audio level, and wherein the second audio level is of a greater volume than the first audio level.

9. The plush toy of claim 6, wherein at least a portion of the hug sensor is comprised of foam.

10. The plush toy of claim 9, wherein the foam is a conductive material.

* * * * *